(12) United States Patent
Woo (10) Patent No.: US 7,929,612 B2
(45) Date of Patent: Apr. 19, 2011

(54) IMAGE INTERPOLATION APPARATUS AND METHODS THAT APPLY QUARTER PEL INTERPOLATION TO SELECTED HALF PEL INTERPOLATION RESULTS

(75) Inventor: Won-Hee Woo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1730 days.

(21) Appl. No.: 11/136,214

(22) Filed: May 24, 2005

(65) Prior Publication Data
US 2005/0265458 A1   Dec. 1, 2005

(30) Foreign Application Priority Data

May 28, 2004 (KR) .................. 10-2004-0038328

(51) Int. Cl.
H04N 7/12 (2006.01)
H04N 11/02 (2006.01)
H04N 11/04 (2006.01)
H04B 1/66 (2006.01)

(52) U.S. Cl. ................................. 375/240.17
(58) Field of Classification Search .............. None
See application file for complete search history.

(56) References Cited

U.S. PATENT DOCUMENTS

| 5,701,160 | A | * | 12/1997 | Kimura et al. | ........... 375/240.14 |
| 5,903,312 | A |   | 5/1999  | Malladi et al. | |
| 6,104,753 | A | * | 8/2000  | Kim et al.    | ................ 375/240.16 |
| 6,295,089 | B1 | * | 9/2001 | Hoang         | ...................... 348/390.1 |
| 6,876,702 | B1 | * | 4/2005 | Hui et al.    | ................. 375/240.16 |
| 2001/0046264 | A1 | | 11/2001 | Fandrianto et al. | |
| 2003/0112864 | A1 | | 6/2003 | Karczewicz et al. | |

FOREIGN PATENT DOCUMENTS

| EP | 0 613 304 A2 | 8/1994 |
| EP | 0 712 249 A2 | 5/1996 |
| EP | 1 353 514 A2 | 10/2003 |
| JP | 2003-333599 A | 11/2003 |
| JP | 2003-348595 A | 12/2003 |
| KR | 1999-0058255 A | 7/1999 |

OTHER PUBLICATIONS

Communication with European Search Report, Application No. EP 05 25 3276, Oct. 15, 2010.
Advanced video coding for generic audiovisual services, *ITU-T Recommendation H. 264* (May 1, 2003) pp. 125-129.
IBM "Highly Parallel, Flexible Half Pel and Dual Prime Motion Estimation System" *IBM Technical Disclosure Bulletin* 39(12):161-166 (Dec. 1996).

* cited by examiner

*Primary Examiner* — Nhon T Diep
(74) *Attorney, Agent, or Firm* — Myers Bigel Sibley & Sajovec, P.A.

(57) ABSTRACT

An image interpolation apparatus includes a half pel interpolation unit that is configured to perform half pel interpolation on input data to provide half pel interpolation results. A data selection unit is configured to select a portion of the half pel interpolation results to provide a selected portion of the half pel interpolation results. A quarter pel interpolation unit is configured to perform a quarter pel interpolation on the selected portion of the half pel interpolation results, in response to a motion vector. The half pel interpolation unit can operate independent of the motion vector. The quarter pel interpolation unit can generate a data selection signal in response to the motion vector, and the data selection unit can be responsive to the data selection signal. Related methods also are disclosed.

19 Claims, 11 Drawing Sheets

IMAGE INTERPOLATION APPARATUS AND METHODS THAT APPLY QUARTER PEL INTERPOLATION TO SELECTED HALF PEL INTERPOLATION RESULTS

CROSS-REFERENCE TO RELATED APPLICATIONS

This application claims the benefit under 35 U.S.C. §119 of Korean Patent Application 2004-38328 filed on May 28, 2004, the disclosure of which is hereby incorporated herein by reference in its entirety as if set forth fully herein.

FIELD OF THE INVENTION

The present invention relates to compression and restoration of images, and more particularly, to image interpolation apparatus and methods for compressing and restoring images.

BACKGROUND OF THE INVENTION

With the development of technologies for digital signal processing, storage media, and transmission methods, traditional voice services have developed into multimedia services. As a result, various compression technologies for storing and transmitting a large amount of data have been under study. In particular, standard specifications for technologies for encoding and storing digital moving picture information have been established. For example, The International Telecommunication Union (ITU) established H.261 and H.263 that are standard specifications for moving image services in wired and wireless communication network environments, and the International Organization for Standardization (ISO) prepared MPEG-1, MPEG-2, and MPEG-4 that are moving picture standard specifications. With the rapid spread of wireless communications, specifications on moving picture compression technologies capable of providing improved compression under various communication environments have become desirable.

Recently, the H.264 moving picture compression standard has been established by ITU and ISO, which can provide more flexibility in coping with various network environments and greater efficiency of encoding moving pictures. However, according to the H.264, an encoder and a decoder may be more complicated than those of a conventional compression method. In particular, the encoder may determine more parameters and encoding modes than in a conventional standard and the decoder may perform more calculations than in the conventional standard due to a de-blocking filter or motion compensation in units of quarter pel.

In general, according to the H.264, in order to perform motion compensation, quarter pel interpolation is performed to enlarge an image four times. Then, motion estimation is performed. In order to perform the above-described operations, quarter precision may be used, which may increase the processing complexity. Also, according to the H.264, a fixed macro block generally is not processed, but various kinds of sub-macro blocks are processed. Such a variable block size characteristic may need to be considered during the quarter pel interpolation.

SUMMARY OF THE INVENTION

An image interpolation apparatus according to embodiments of the invention includes a data storage unit that is configured to store macro block data to be interpolated and peripheral macro block data used for interpolation. A half pel interpolation unit is configured to receive data corresponding to one row of the data storage unit and to perform half pel interpolation thereof. A data selection unit is configured to select a portion (or part) of a plurality of half pel interpolation results output from the half pel interpolation unit in response to data selection signals. A quarter pel interpolation unit is configured to generate the data selection signals in response to a motion vector of a decoded image and to perform quarter pel interpolation in response to the half pel interpolation results selected by the data selection unit. The quarter pel interpolation is selectively performed in accordance with the motion vector.

In some embodiments, the half pel interpolation unit comprises an input buffer that is configured to receive the row data in response to a clock signal and to sequentially shift previously received row data to store a plurality of row data items. A first operator is configured to receive one row data item from the input buffer to perform half pel interpolation on a plurality of pixel values included in the row data in a first direction. A second operator is configured to receive one row data item from the input buffer while the first operator performs half pel interpolation, to perform half pel interpolation on a plurality of pixels included in the row data in a second direction. A third operator is configured to receive the half pel interpolation results of the second operator to perform the half pel interpolation in the first direction. Finally, an output buffer is configured to store the row data output from the input buffer and the half pel interpolation results performed by the first to third operators.

According to other embodiments, the first to third operators arrange the plurality of pixel values included in the row data to be offset by one to perform half pel interpolation on a plurality of pixels that exist in the same row in parallel. According to other embodiments, when the data storage unit has a size of (M+5)×(N+5), the input buffer comprises (M+5) line registers for storing row data composed of (N+5) input from the data storage unit by pixels and a plurality of data items that belong in respective rows are stored in respective line registers. Moreover, according to some embodiments, the second operator performs half pel interpolation on data stored in the respective (M+5) line registers of the input buffer in parallel.

Image interpolation apparatus according to other embodiments of the invention include a half pel interpolation unit that is configured to perform half pel interpolation on input data, to provide half pel interpolation results. A data selection unit is configured to select a portion of the half pel interpolation results, to provide a selected portion of the half pel interpolation results. A quarter pel interpolation unit is configured to perform quarter pel interpolation on the selected portion of the half pel interpolation results in response to a motion vector.

In some embodiments, the half pel interpolation unit is configured to perform half pel interpolation on input data independent of the motion vector. In other embodiments, the quarter pel interpolation unit is further configured to generate a data selection signal in response to the motion vector, and the data selection unit is configured to select the portion of the half pel interpolation results in response to the data selection signal. Moreover, in some embodiments, six lines of half pel interpolation results are provided and two of the six lines of the half pel interpolation results are selected for quarter pel interpolation.

It also will be understood that, although embodiments of the present invention have been described above with respect to image interpolation apparatus, analogous image interpolation methods also may be provided according to various embodiments of the present invention. Moreover, although embodiments of the present invention are described herein with respect to the H.264 standard, embodiments of the present invention may be used with other standards or independent of standards. Finally, it will be understood that the terms "half pel" and "quarter pel" have been used herein to generally indicate sub-pel operations of differing relative resolutions and are not restricted to specific quarter pel and half pel operations.

DETAILED DESCRIPTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "responsive", "connected" or "coupled" to another element, it can be directly responsive, connected or coupled to the other element or intervening elements may be present. In contrast, when an element is referred to as being "directly responsive", "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first operator could be termed a second operator, and, similarly, a second operator could be termed a first operator without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention is described in part below with reference to block diagrams and flowcharts of methods, systems and/or computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. A computer program according to embodiments of the invention comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Image interpolation apparatus/methods, according to various embodiments of the present invention, may allow quarter pel interpolation that includes a large amount of calculation not to be performed at once. Rather, half pel interpolation processes and quarter pel interpolation processes may be separated from one another and may be performed step by step. The quarter pel interpolation may be selectively performed with reference to a motion vector and the half pel interpolation processes may be performed by shifting data stored in registers in units of a row in a lower direction.

Figure 1:
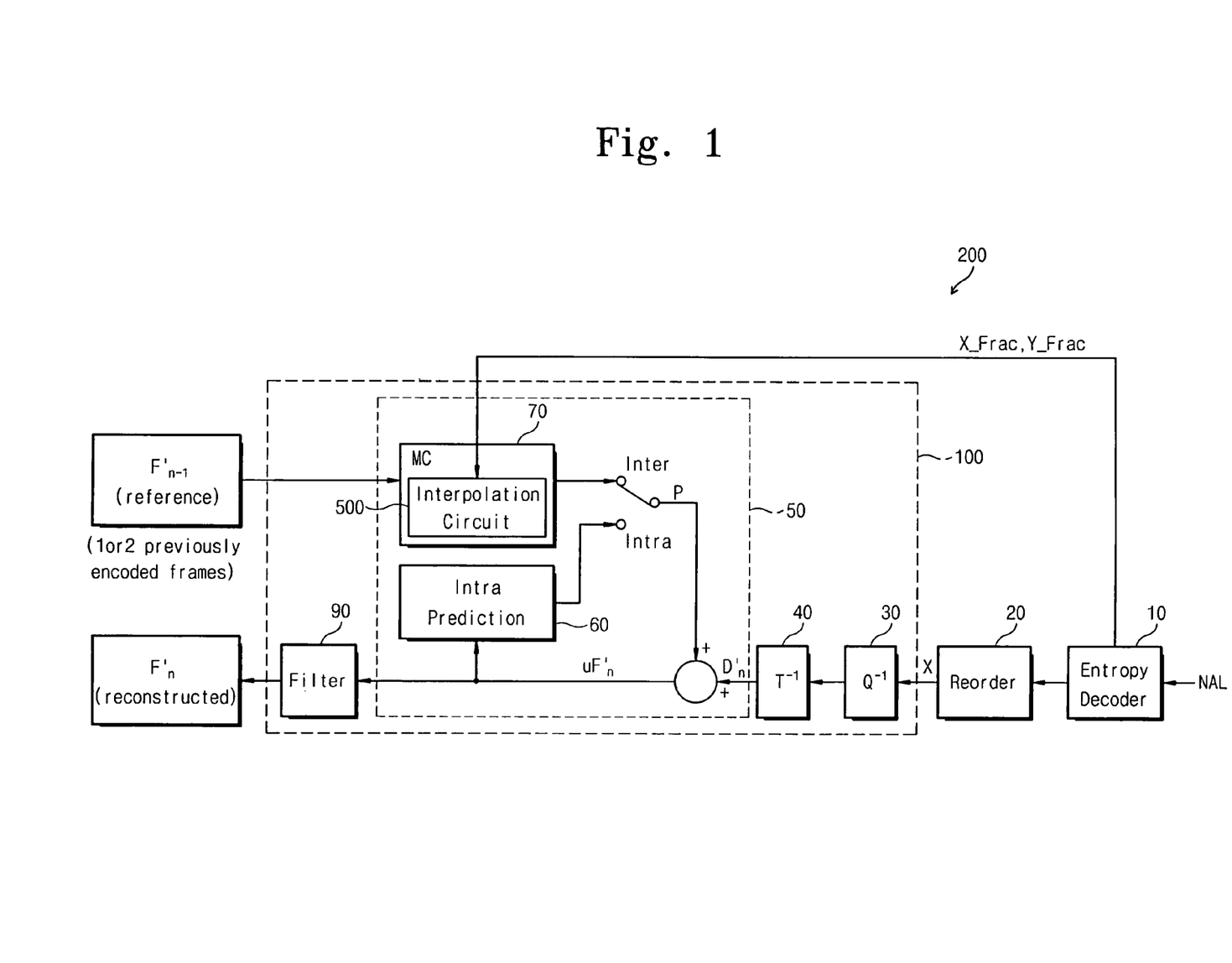
FIG. 1 is a block diagram of an image decoder according to exemplary embodiments of the present invention.
Figure 2:
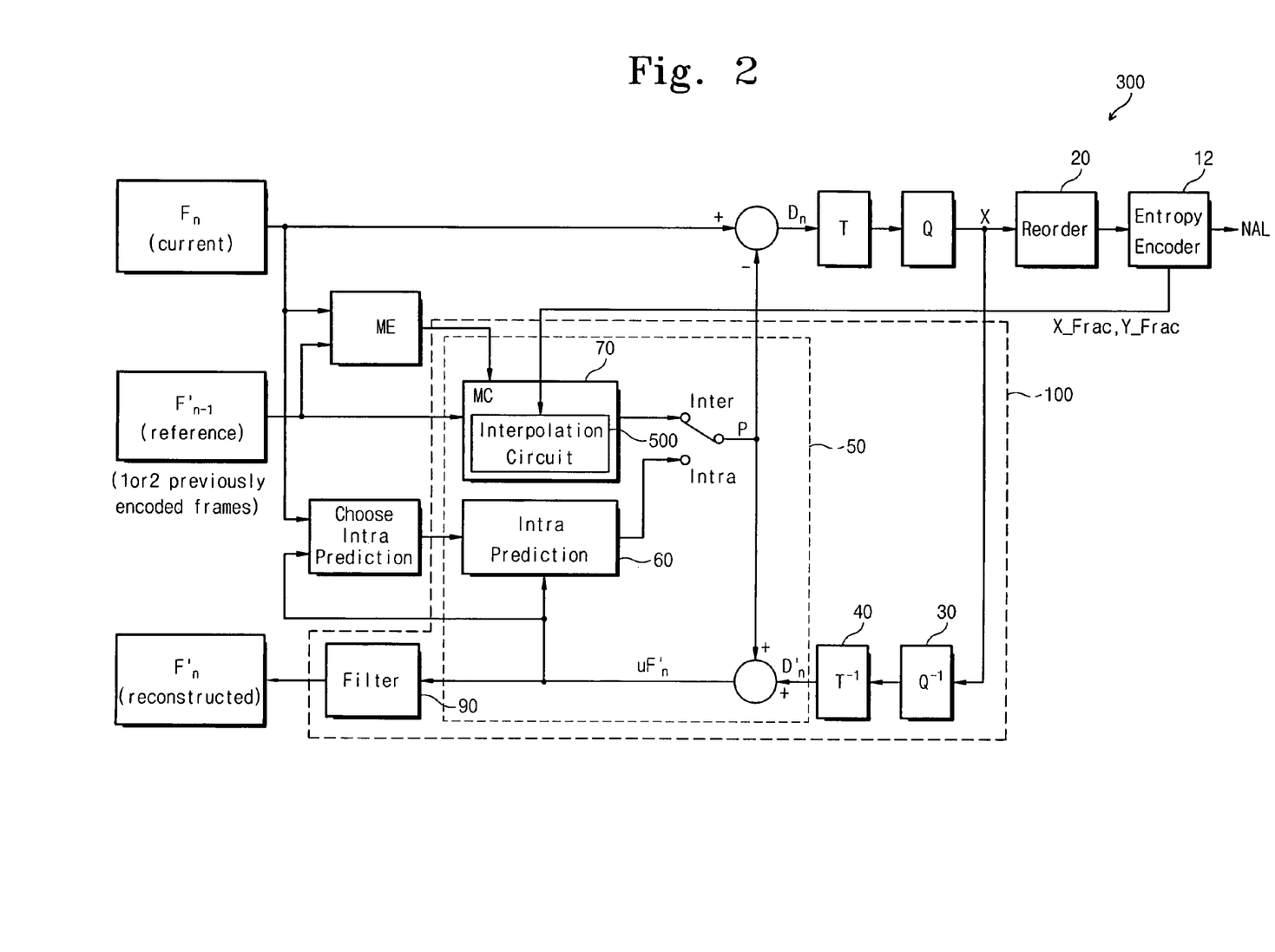
FIG. 2 is a block diagram of an image encoder according to exemplary embodiments of the present invention.

FIG. 1 is a block diagram of an MPEG decoder 200 according to various embodiments of the present invention. FIG. 2 is a block diagram of an MPEG encoder 300 according to various embodiments of the present invention. In some embodiments, the decoder 200 and the encoder 300 illustrated in FIGS. 1 and 2 may be constructed in accordance with the H.264 standard. The block represented by the reference numeral 100 is commonly included in the decoder 200 and the encoder 300 in accordance with the H.264 standard. Therefore, in order to avoid redundancy and to simplify explanation, the circuit structure of the MPEG decoder 200 will be described in detail.

Referring to FIG. 1, the MPEG decoder 200 includes an entropy decoding unit 10 that is configured to receive a network abstraction layer (NAL) that is a compressed bit stream to decode entropy, a re-ordering unit 20 that is configured to rearrange the data in groups, an inverse quantization unit 30 that is configured to inverse quantize data output from the reordering unit 20, an inverse discrete cosine transform (IDCT) unit 40 that is configured to inverse discrete cosine transform the inverse quantized data, an intra/inter data prediction unit 50 that is configured to perform intra/inter data prediction to compensate for intra/inter data, and an in-loop de-blocking filter 90 that is configured to remove errors generated in an inverse quantization process. The intra/inter data prediction unit 50 includes an inter data prediction unit 60 that is configured to perform inter data prediction and a motion compensation unit 70 that is configured to perform intra data prediction. The motion compensation unit 70 includes an interpolation circuit 500 that is configured to interpolate images in order to more precisely compensate for motion.

Since the decoder 200 and the encoder 300 illustrated in FIGS. 1 and 2 can follow the H.264 standard, the interpolation circuit 500 performs the quarter pel interpolation. According to some embodiments of the invention, the interpolation circuit 500 does not perform the quarter pel interpolation at once but separates half pel interpolation processes from quarter pel interpolation processes to perform the half pel interpolation processes and the quarter pel interpolation processes step by step, as will be described in detail hereinafter. In particular, in some embodiments, the quarter pel interpolation processes performed by the interpolation circuit 500 are selectively performed in response to a motion vector (X_Frac, Y_Frac) provided by the entropy decoding unit 10 (or an analogous entropy encoding unit 12 of FIG. 2). Since the interpolation processes performed by the interpolation circuit 500 may be obtained by shifting data stored in registers in units of a row in a lower direction, these half pel calculations may be performed rapidly. Also, since a reduced number of registers that can be applied to all sub-macro blocks having various sizes may be included in some embodiments, the entire structure of the interpolation circuit 500 can be made simple. Before describing a detailed embodiment of an interpolation circuit 500 according to some embodiments of the invention, an interpolation operation and an interpolation result with respect to a decoded image according to some embodiments of the present invention will be described as follows.

Figure 3:
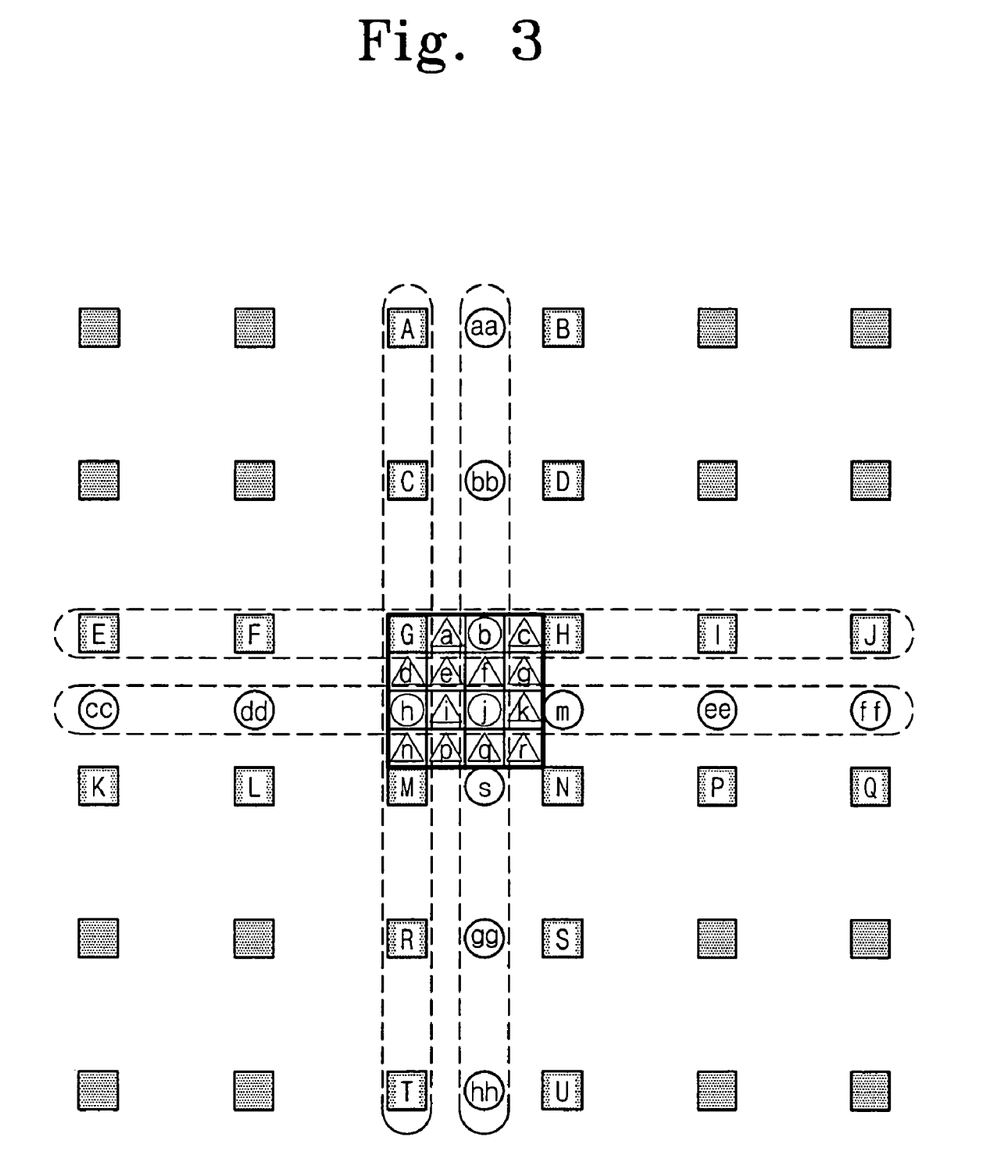
FIGS. 3 to 5 illustrate interpolation operations according to exemplary embodiments of the present invention.
Figure 4:
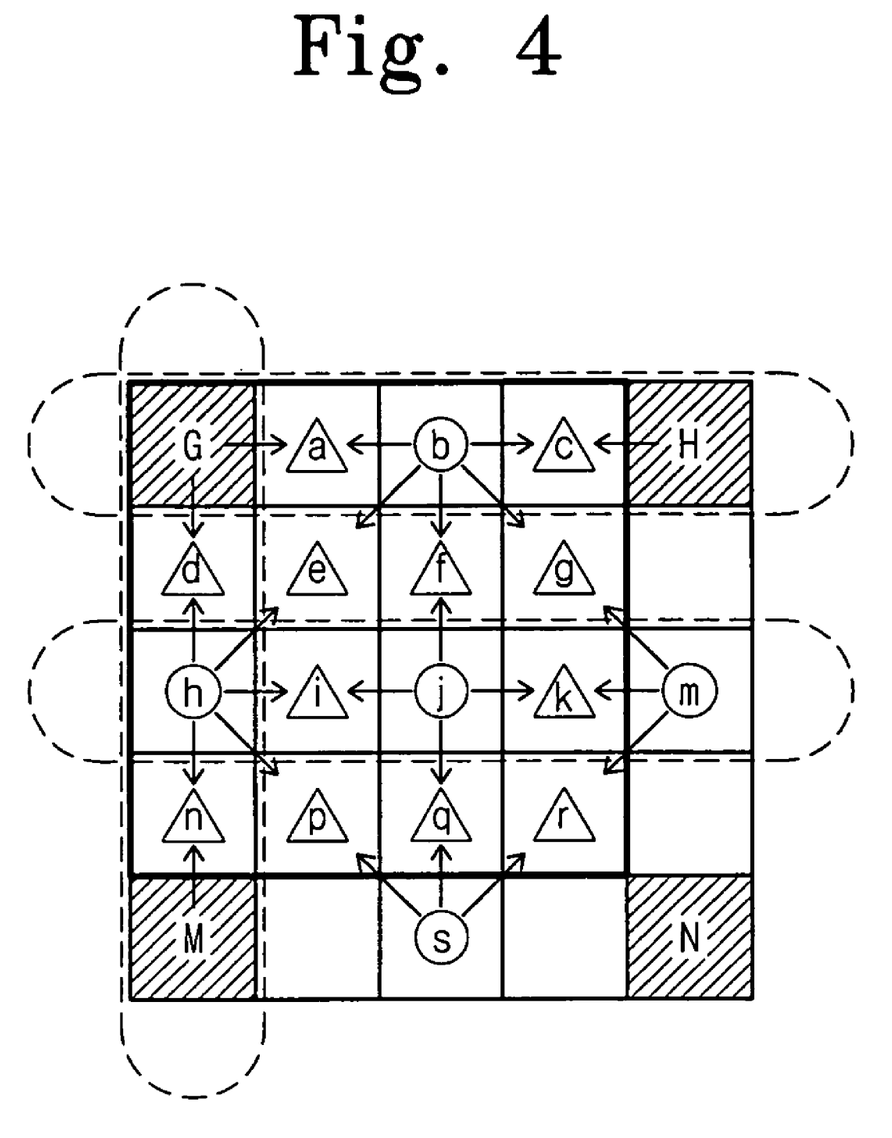
Figure 5:
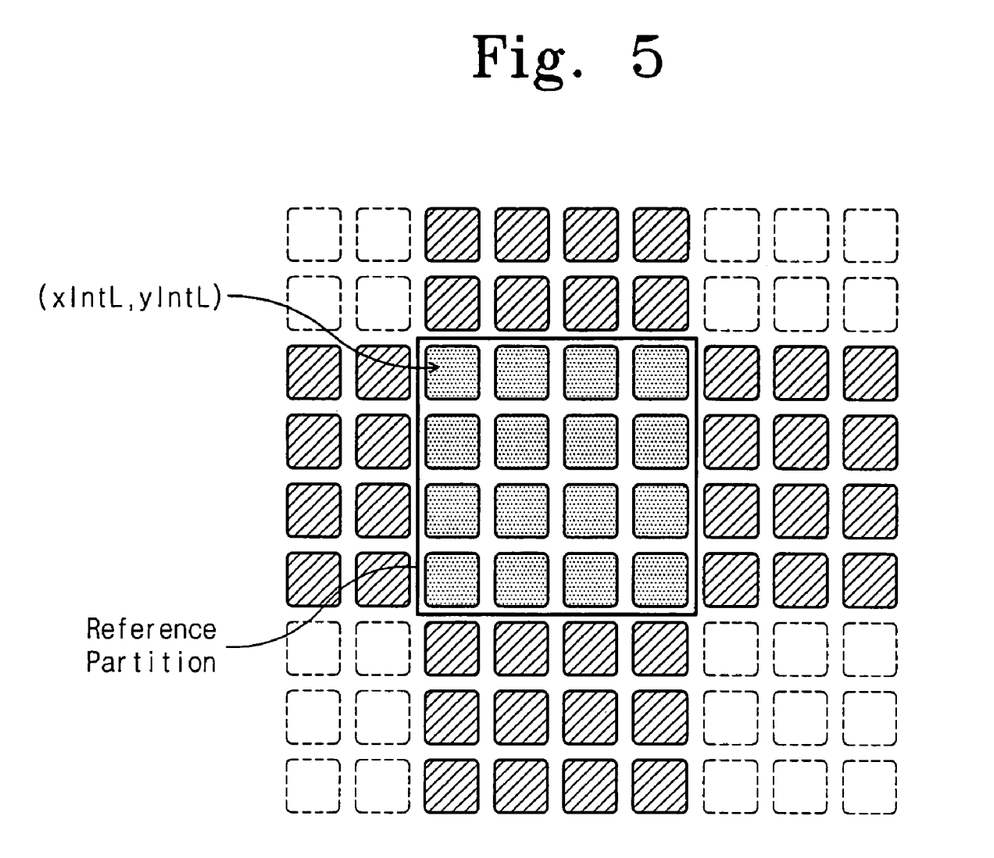

FIGS. 3 to 5 illustrate interpolation operations according to various embodiments of the present invention. FIG. 4 illustrates an interpolation block (that is, a reference partition) illustrated in FIG. 3.

Referring to FIGS. 3 and 4, the portions marked with squares represent integer pel pixels, i.e., decoded pixels. Portions marked with circles represent half pel interpolation results. Portions marked with triangles represent quarter pel interpolation results.

As illustrated in the drawings, in order to obtain a half pel interpolation result according to some embodiments of the invention, six integer pel pixels in a row or column direction are used. In order to obtain a quarter pel interpolation result, two half pel interpolation results are used. Therefore, in order to obtain interpolation results with respect to the pixels corresponding to the outline of an image, as illustrated in FIG. 5, five data items in each of the row and column directions are further included with respect to a reference partition (refer to portions marked with oblique lines). Therefore, 9×9 data (that is, 9=4+5) may be used for a 4×4 macro block and 21×21 data (that is, 21=16+5) may be used for a 16×16 macro block according to various embodiments of the invention.

Therefore, according to the some embodiments of present invention, the size of a data storage unit 520 is set as 21×21. In some embodiments that implement H.264, such a structure of the data storage unit 520 allows the data storage unit to be used for all cases, since H.264 performs motion compensation in units of 16×16, 16×8, 8×8, 8×16, 8×8, 8×4, 4×8, and 4×4 blocks. In FIG. 5, the coordinates of the reference partition are represented by the coordinate value of the left uppermost end (such as xIntL, yIntL).

Referring to FIG. 4 again, the structure of an interpolation block, according to some embodiments of the present invention, will be described. Capital letters "G, H, M, and N" denote integer pel pixels, that is, pixels obtained by performing decoding. "b, h, and j" marked with circles denote pixels obtained by half pel interpolation (hereinafter, referred to as half pel pixels). Pixels marked with triangles denote pixels obtained by quarter pel interpolation (hereinafter, referred to as quarter pel pixels).

A distinction between the respective pixels that constitute an interpolation block illustrated in FIG. 4 by interpolation steps, according to some embodiments of the present invention, is described as follows:

TABLE 1

| First Step | Second Step | Third Step |
|---|---|---|
|  | j |  |
|  | a |  |
|  | c | f |
| b | d | i |
| h | n | k |
|  | e | q |
|  | g |  |
|  | p |  |
|  | r |  |

Interpolation with respect to the pixels represented in TABLE 1 is divided into total of three steps of operations. Since half pel pixels excluding "j" are operated by the values of the given integer pel pixels, they belong to a first step that is first obtained. A second step is obtained using the operation result of the first step. A third step is obtained using the operation result of the second step.

The interpolation results obtained by TABLE 1 are divided into half pel pixels (b, h, and j) and quarter pel pixels (a, c, d, n, e, g, p, r, f, i, k, and q). An interpolation circuit 500 according to some embodiments of the present invention may be designed such that a function of obtaining the half pel pixels is separate from a function of obtaining the quarter pel pixels.

Figure 6:
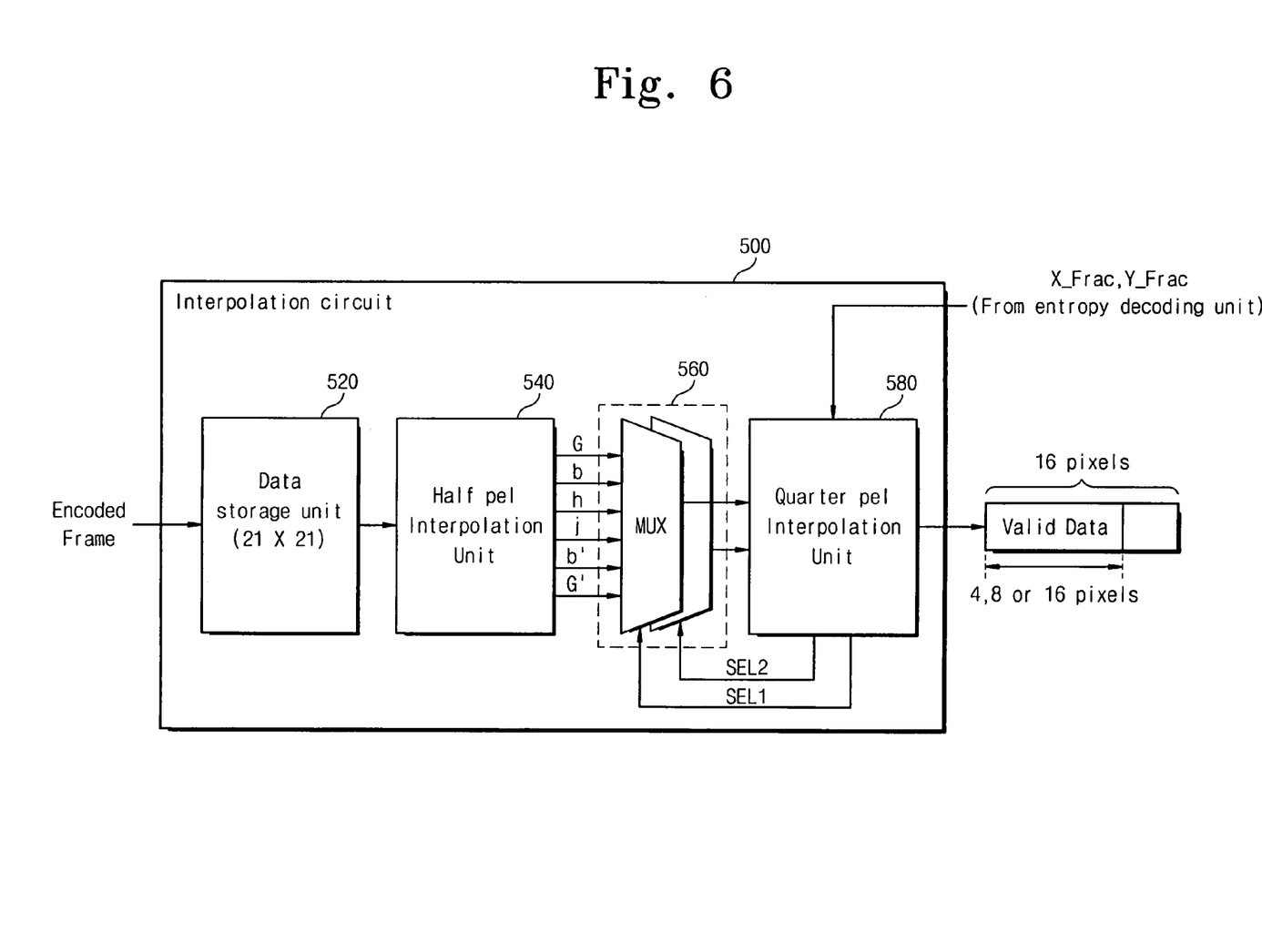
FIG. 6 is a block diagram illustrating an interpolation circuit according to exemplary embodiments of the present invention.
Figure 7:
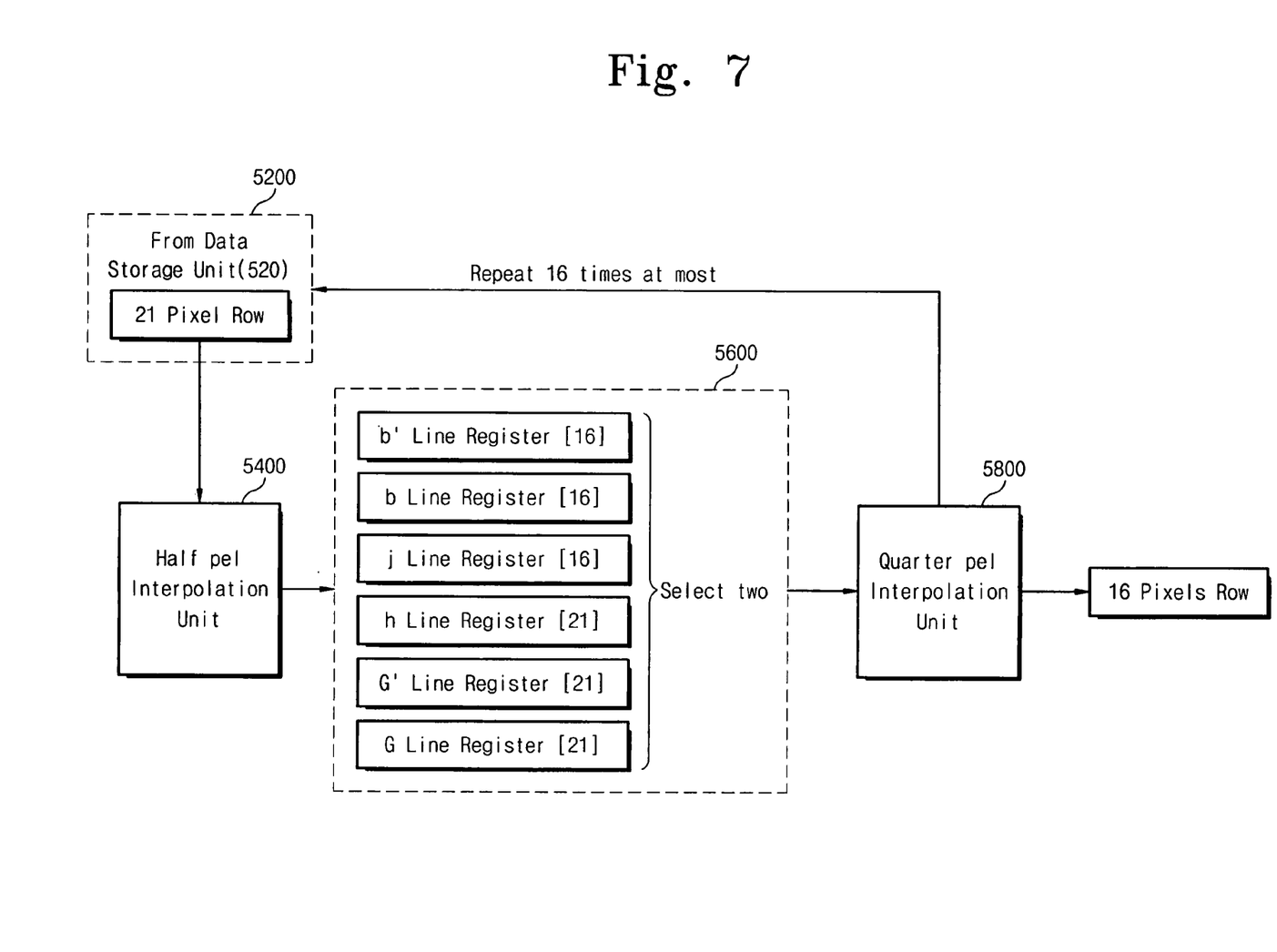
FIG. 7 illustrates interpolation operations that may be performed by an interpolation circuit illustrated in FIG. 6.

FIG. 6 is a block diagram illustrating an interpolation circuit, such as the interpolation circuit 500, according to various embodiments of the present invention. FIG. 7 illustrates interpolation operations that may be performed by the interpolation circuit 500 illustrated in FIG. 6.

Referring to FIGS. 6 and 7, an interpolation circuit 500 according to various embodiments of the present invention includes a data storage unit 520, a half pel interpolation unit 540, a data selection unit 560, and a quarter pel interpolation unit 580. In some embodiments, the data storage portion 520 is composed of a 21×21 buffer larger than a 16×16 macro block by five in each of row and column directions so as to store data items used for performing half pel interpolation and quarter pel interpolation on a macro block.

The half pel interpolation unit 540 receives one row data item per clock cycle (that is, 21 integer pel pixel values) from the data storage unit 520 (refer to 5200 of FIG. 7) and performs half pel interpolation to output total six lines of row data G, b, h, j, b', and G' (refer to 5400 of FIG. 7). Here, one row data item of 16 or 21 pixels is stored in an assigned line register.

In FIG. 4, it is noted from the structure of one interpolation block that half pel interpolation pixels such as "b, h, and j" are generated with respect to one integer pel pixel. Therefore, in FIGS. 6 and 7, since an input includes 21 integer pel pixels, the outputs of the half pel interpolation unit 540 denoted by "G, b, h, j, b', and G'" is composed of 16 or 21 pixels.

The data selection unit 560 selectively outputs two lines of row data among the six lines of row data (G, b, h, j, b', and G') provided by the half pel interpolation unit 540 in response to selection signals SEL1 and SEL2 output from the quarter pel interpolation unit 580 (refer to 5600 of FIG. 7).

The data items (G, b, h, j, b', and G') output from the half pel interpolation unit 540 are stored in the six line registers. Here, the row data denoted by "G" of 21 pixels means the row data received one per clock cycle (that is, decoded 21 integer pel pixels) from the data storage unit 520 and the row data denoted by "G'" of 21 pixels means that the data "G" is shifted after the lapse of one clock cycle. The row data denoted by "b" of 16 pixels means a half pel interpolation result corresponding to the position of the pixel "b" illustrated in FIG. 4 and the row data denoted by "b'" of 16 pixels means that the data "b" is shifted after the lapse of one clock cycle. The row data denoted by "h" of 21 pixels means a half pel interpolation result corresponding to the position of the pixel "h" illustrated in FIG. 4. The row data denoted by "j" of 16 pixels means a half pel interpolation result corresponding to the position of the pixel "j" illustrated in FIG. 4.

The quarter pel interpolation unit 580 generates the selection signals SEL1 and SEL2 that are configured to select two lines of row data among six lines of row data in response to the motion vector (X_Frac, Y_Frac) provided by the entropy decoding unit 10 and transmits the selection signals SEL1 and SEL2 to the data selection unit 560. The quarter pel interpolation unit 580 performs quarter pel interpolation by averaging the data received through the data storage unit 560 (refer to 5800 of FIG. 7). In some embodiments, the quarter pel interpolation unit 580 performs quarter pel interpolation on the respective data items input from the data selection unit 560 in parallel by each pixel to output a quarter pel interpolation result composed of total 16 pixels. Such a quarter pel interpolation operation may not be performed when the motion vector X_Frac, Y_Frac represents a half pel interpolation result but the half pel interpolation result may be output as it is.

Figure 8:
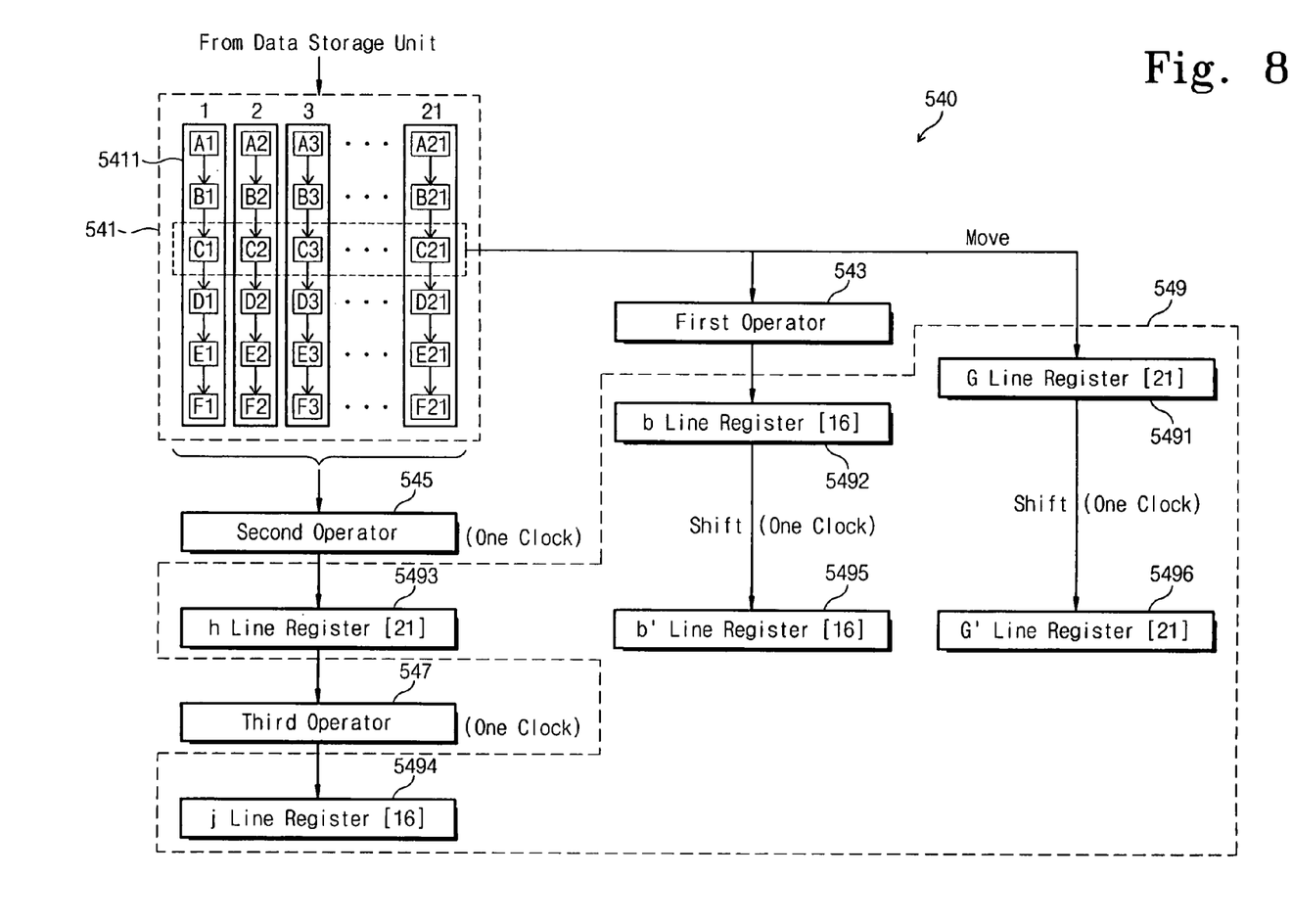
FIG. 8 illustrates a detailed structure of a half pel interpolation unit illustrated in FIG. 6 according to exemplary embodiments of the present invention.

FIG. 8 illustrates a half pel interpolation unit according to various embodiments of the invention, such as the half pel interpolation unit 540 illustrated in FIG. 6.

Referring to FIG. 8, a half pel interpolation unit 540 according to various embodiments of the present invention includes an input buffer 541 that is configured to receive row data of one line per one clock (that is, 21 integer pel pixels) from the data storage unit 520 and to store the received row data, a first operator 543 that is configured to receive row data of one line from the input buffer 541 when the six lines of row data items are input to the input buffer 541 to interpolate 16 "b" pixels, a second operator 545 that is configured to interpolate 21 "h" pixels while the first operator 543 interpolates the "b" pixels, a third operator 547 that is configured to interpolate 16 "j" pixels on the basis of the interpolation result performed by the second operator 545, and an output buffer 549 that is configured to store the output data (G, b, h, j, b', and G') of the half pel interpolation unit 540 in six line registers, respectively.

In some embodiments, the input buffer 541 includes 21 line registers. The respective line registers included in the input buffer 541 receive one row data item from the data storage unit 520 with the lapse of one clock cycle, respectively, (that is, 21 integer pel pixel values) and shift the previously stored data by one line in a lower direction (refer to the arrows). After data is input to all the line registers that constitute the input buffer 541, the half pel interpolation unit 540 can simultaneously perform input and half pel interpolation of data every one clock cycle without latency.

To be specific, after the six row data items are input to the input buffer 541 (hereinafter, referred to as first clock timing), the 21 pixel values C1, C2, . . . , and C21 (corresponding to "G") stored in the third line of the input buffer 541 are stored in a first line register 5491 of an output buffer 549. At the same time, the first and second operators 543 and 545 perform interpolation on the pixels "b" and "h". The interpolation results obtained by the first and second operators 543 and 545 are stored in second and third line registers 5492 and 5493, respectively.

Then, in the next one clock cycle (hereinafter, referred to as second clock timing), the third operator 547 performs interpolation on the pixel "j" on the basis of the 21 operation results output from the second operator 545. The 16 pixel values obtained by the interpolation are stored in a fourth line register 5494 of the output buffer 549. On the other hand, the data stored in the input buffer 541 during the second clock timing is shifted by one line in a lower direction and 21 new pixel values C1, C2, . . . , and C21 stored in the third line of the input buffer 541 are stored in a first line register 5491 of the output buffer 549. At the same time, the first operator 543 performs interpolation on the pixel "b". The 21 "G" data items and 16 "b" data items stored in the first and second line registers 5491 and 5492 during the first clock timing are shifted to fifth and sixth line registers 5495 and 5496 of the output buffer 549, respectively, during the second clock timing.

As a result, excluding the initial latency of five clocks, the half pel interpolation unit 540 can perform a series of half pel interpolation operations on one row data item during one clock cycle. The performed interpolation results are stored in the line registers 5491 to 5496 included in the output buffer 549.

Figure 9:
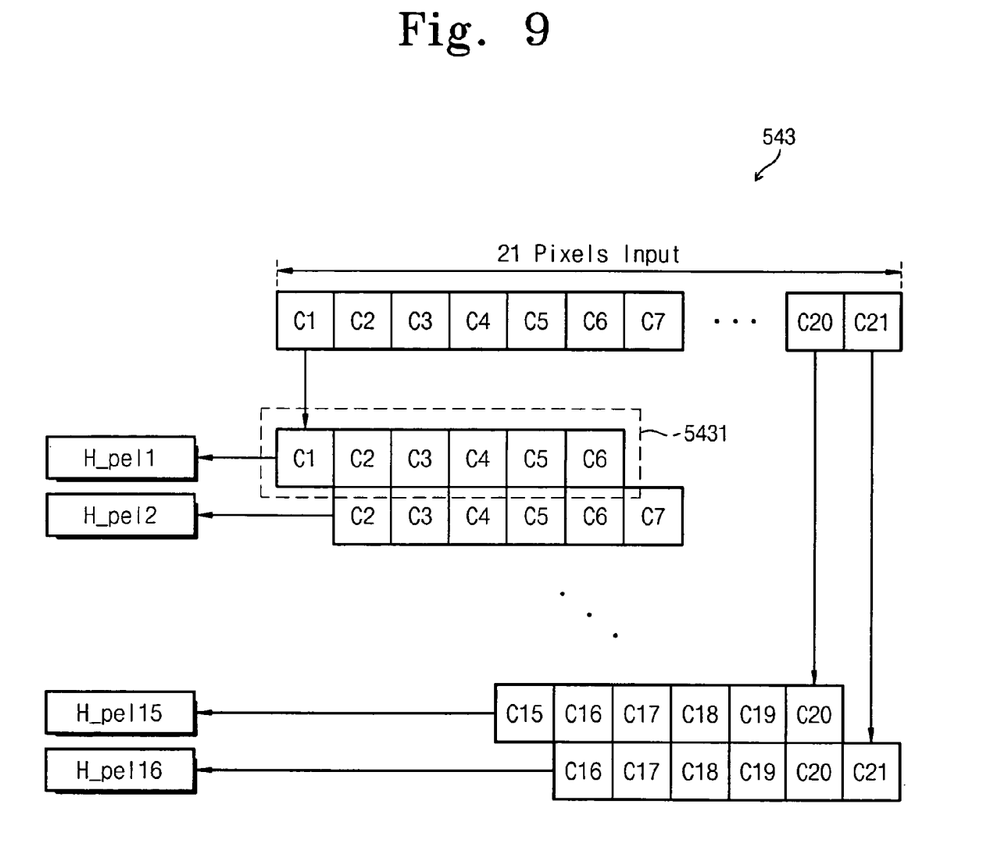
FIGS. 9 and 10 illustrate half pel interpolation operations that may be performed by a first operator according to exemplary embodiments of the present invention.
Figure 10:
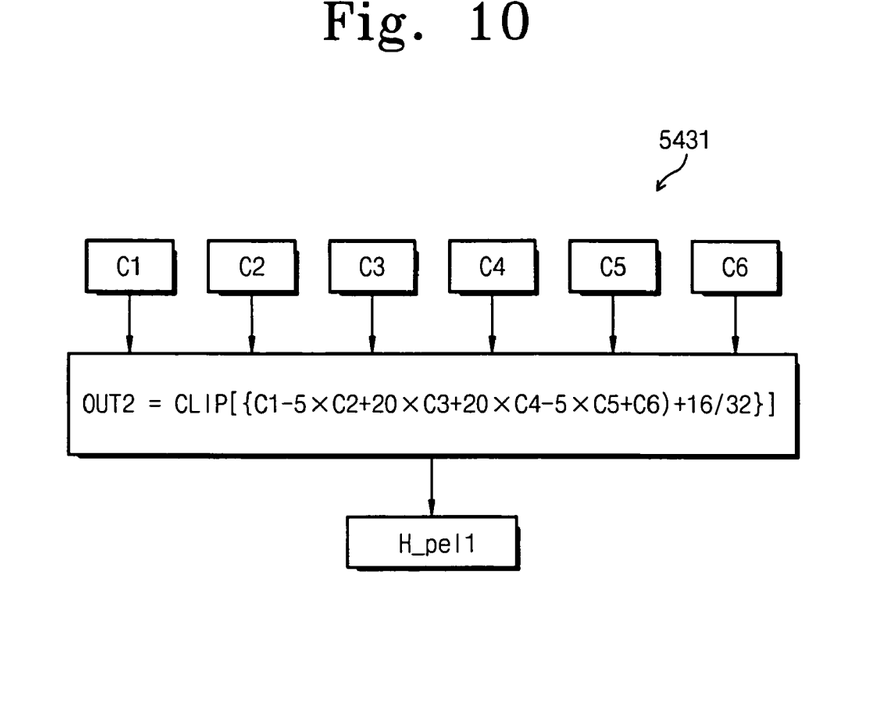
Figure 11:
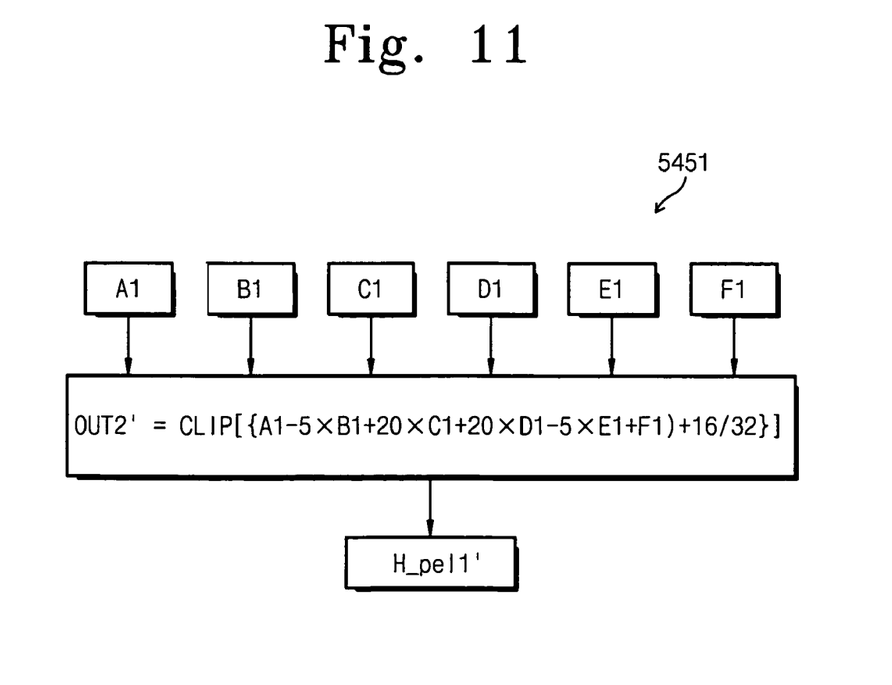
FIG. 11 illustrates half pel interpolation operations that may be performed by a second operator according to exemplary embodiments of the present invention.
Figure 12:
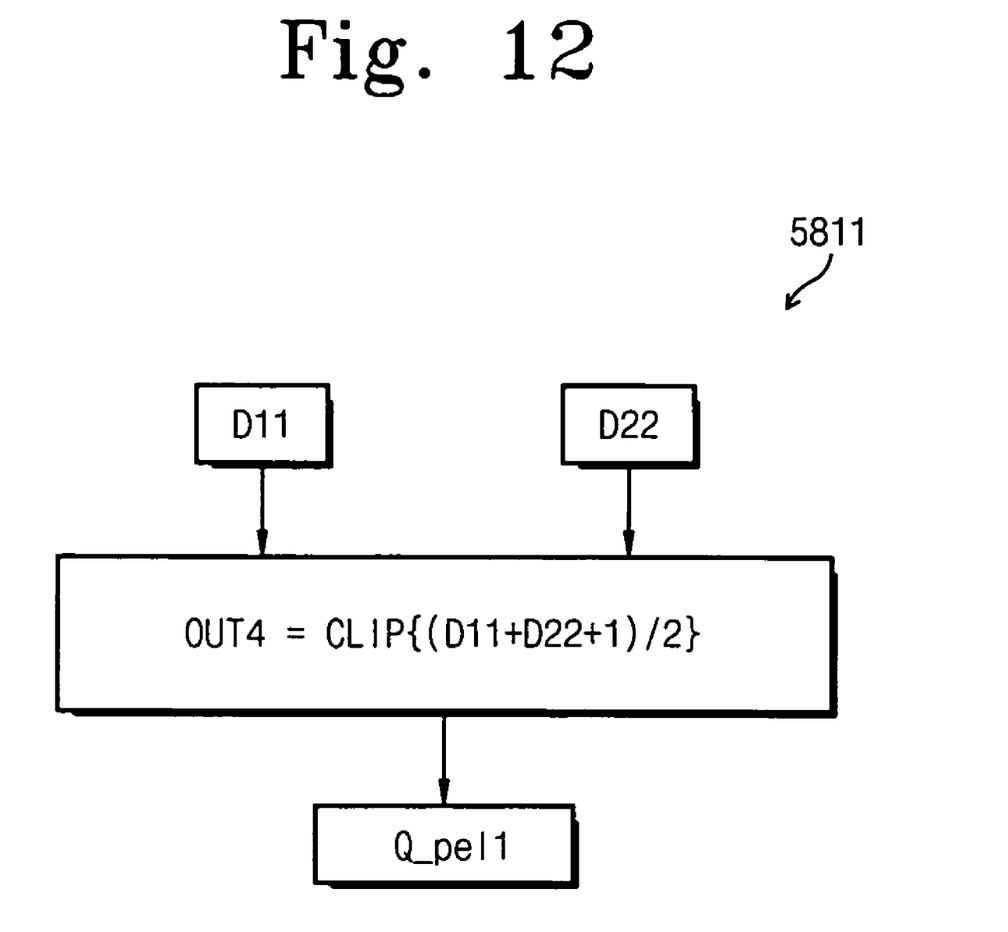
FIG. 12 illustrates quarter pel interpolation operations that may be performed by a third operator according to exemplary embodiments of the present invention.

FIGS. 9 and 10 illustrate the half pel interpolation operations that can be performed by the first operator 543 according to various embodiments of the invention. FIG. 11 illustrates the half pel interpolation operations that can be performed by the second operator 545 according to various embodiments of the invention. FIG. 12 illustrates the quarter pel interpolation operations that can be performed by the third operator 547 according to various embodiments of the invention.

First, referring to FIG. 9, the first operator 543 receives the 21 integer pel pixel values C1, C2, . . . , and C21 from the input buffer 541 during the first clock timing and performs half pel interpolation total 16 times using the six integer pel pixel values (such as C1, C2, . . . , and C6) arranged to be offset by one pixel. At this time, the 16 half pel interpolation operations are performed in parallel and 16 half pel interpolation results H_pel1-H_pel16 are stored in the second-line register 5492 of the output buffer 549. Here, each of the input or output data items corresponds to one pixel data of a line register.

The first operator 543 includes 16 half pel interpolation operators in order to simultaneously perform 16 half pel interpolation operations. One half pel interpolation operator 3431 among the 16 half pel interpolation operators will be described as follows.

Referring to FIG. 10, when a half pel interpolation operation performed by the half pel interpolation operator 3431 is represented by an equation, the half pel interpolation result OUT2 is as follows:

$$\mathrm{OUT2} = \mathrm{Clip}[\{C1 - 5 \ast C2 + 20 \ast C3 + 20 \ast C4 - 5 \ast C5 + C6\} + 16]/32] \quad \text{[EQUATION 1]}$$

where, the six input data items are C1, C2, C3, C4, C5, and C6.

In some embodiments, the half pel interpolation operator 3431 may include a 6-tap finite impulse response (FIR) filter having weights of 1, −5, 2-, 20, −5, and 1. The Clip function shown in EQUATION 1 means that operation results no more than 0 are clipped to 0 and operation results no less than 255 are clipped to 255.

Subsequently, referring to FIG. 11, the second operator 545 simultaneously performs half pel interpolation on each of the 21 line registers included in the input buffer 541 without considering the arrangement relationship of input data. Therefore, the second operator 545 includes 21 half pel interpolation operators for simultaneously performing 21 half pel interpolations. One half pel interpolation operator 3451 among the 21 half pel interpolation operators will be described as follows.

Referring to FIGS. 8 and 11, when a half pel interpolation operation performed by the half pel interpolation operator 3451 is represented by an equation, the half pel interpolation result OUT2' is as follows:

$$\mathrm{OUT2'} = \mathrm{Clip}[\{A1 - 5 \ast B2 + 20 \ast C1 + 20 \ast D1 - 5 \ast E1 + F1\} + 16]/32] \quad \text{[EQUATION 2]}$$

where, the six input data items are A1, B2, C1, D1, E5, and F6.

In some embodiments, the half pel interpolation operator 3451 may include a 6-tap finite impulse response (FIR) filter having weights of 1, −5, 2-, 20, −5, and 1 like the half pel interpolation operator 3431 illustrated in FIG. 10. The Clip function shown in EQUATION 2 also means that operation results no more than 0 are clipped to 0 and operation results no less than 255 are clipped to 255.

After 21 "h" pixel values are obtained by the second operator 545, the third operator 547 receives 21 "h" pixel values from the second operator 545 during the second clock timing to obtain 16 "j" pixels. The interpolation performed at this time may be the same as illustrated in FIG. 9 and the half pel interpolation performed on the respective pixels are simultaneously performed.

The structures and operations of the data selection unit 560 and the quarter pel interpolation unit 580 will be described as follows with reference to FIGS. 6 and 12.

In embodiments of FIG. 6, the data selection unit 560 includes two multiplexers that receive the six lines of row data (G, b, h, j, b', and G') output from the half pel interpolation unit 540 to output two lines of row data. The selection signals SEL1 and SEL2 of the respective multiplexers are generated by the quarter pel interpolation unit 580. The quarter pel interpolation unit 580 receives the motion vector X_Frac, Y_Frac provided by the entropy decoding unit 10 and selects half pel pixel values corresponding to the positions in which quarter pel interpolation is to be performed. If the motion vector X_Frac, Y_Frac provided by the entropy decoding unit 10 represents a half pel pixel value, the quarter pel interpolation unit 580 may not perform additional quarter pel interpolation, but the half pel interpolation result is output from the half pel interpolation unit 540 as a quarter pel interpolation result as it is. When the motion vector X_Frac, Y_Frac provided by the entropy decoding unit 10 represents a quarter pel pixel value, the quarter pel interpolation unit 580 performs quarter pel interpolation using the two row data items output from the half pel interpolation unit 540 to output data of 16 pixels.

Subsequently, referring to FIG. 12, the quarter pel interpolation unit 580 receives the two-row data items output from the half pel interpolation unit 540 to output 16 quarter pel pixel values. The quarter pel interpolation unit 580 includes 16 quarter pel interpolation operators. Quarter pel interpolation is performed on the respective pixels through the 16 quarter pel interpolation operators in parallel. The structure of one quarter pel interpolation operator 5811 among the 16 quarter pel interpolation operators will be described with reference to FIG. 12.

Referring to FIG. 12, when the input data items of the quarter pel interpolation operators 5811 are D11 and D22 and the quarter pel interpolation result is OUT4, the following equation is established:

$$\mathrm{OUT4} = \mathrm{Clip}\{(D11 + D22 + 1)/2\}. \quad \text{[EQUATION 3]}$$

Row lines of a partition block are calculated by the above operation. This is about an average value of the half pel interpolation result.

The data output from the quarter pel interpolation unit 580 has values of 16 pixels and the number of valid pixels of the output data varies with a unit of a decoded macro block (such as 4 pixels, 8 pixels, and 16 pixels). According to some embodiments of the present invention, a circuit has a size of 16 pixels so as to accept all the operation results on the above-described various kinds of macro blocks. The block size applied to the interpolation circuit 500 can be selected in accordance with a mode signal (not shown) generated by the entropy decoder 10.

The time for interpolating one macro block will be described as follows. When a macro block is composed of 4×4 pixels, the time spent on processing one macro block may be a total of 352 clock cycles. When a macro block is composed of 8×8 pixels, the time spent on processing one macro block may be a total of 152 clock cycles. When a macro block is composed of 16×16 pixels, the time spent on processing one macro block may be a total of 70 clock cycles. Therefore, interpolation circuits/methods according to some embodiments of the present invention can perform interpolation operations within 676 cycles in a high definition (HD) image. As a result, interpolation circuits/methods according to some embodiments of the present invention may be suitable for processing high quality images such as HD images.

As described above, interpolation circuits/methods 500 according to some embodiments of the present invention may not perform quarter pel interpolation that includes a large amount of calculation but may separate the half pel interpolation from the quarter pel interpolation to perform the half pel interpolation and the quarter pel interpolation step by step. The quarter pel interpolations may be selectively performed with reference to the motion vector and the half pel interpolations may be performed by shifting the data stored in the registers in units of a row in a lower direction. Therefore, calculation can be performed more rapidly. Since various operations related to interpolation may be simultaneously performed while the registers are shifted, operation time may be reduced. Since a reduced or minimum number of registers may be included for interpolation, the registers can support the sizes of variable sub-macro blocks, and the pixels can move in one direction, it is possible to simplify the structure of these interpolation circuits/methods. In such a case, complexity may increase more or less due to the variable block size characteristic of H.264. However, the half pel interpolation can be applied to all the block sizes.

As described above, according to various embodiments of the present invention, it is possible to perform high speed quarter pel interpolation that supports a moving picture compression standard such as the H.264/JVT/MPEG4 Part 10/other standards, and/or may be independent of standards, with a potentially smaller size and a potentially simpler circuit structure.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An image interpolation apparatus comprising:
    a data storage unit that is configured to store macro block data to be interpolated and peripheral macro block data used for interpolation;
    a half pel interpolation unit that is configured to receive data corresponding to one row of the data storage unit and to perform half pel interpolation thereof;
    a data selection unit that is configured to select a portion of a plurality of half pel interpolation results output from the half pel interpolation unit in response to data selection signals; and
    a quarter pel interpolation unit that is configured to generate the data selection signals in response to a motion vector of a decoded image and to perform quarter pel interpolation in response to the half pel interpolation results selected by the data selection unit;
    wherein the quarter pel interpolation is selectively performed in accordance with the motion vector, and
    wherein the data storage unit stores data of a size of (M+5)×(N+5) when a macro block has a size of M×N.

2. The image interpolation apparatus as set forth in claim 1, wherein the half pel interpolation unit comprises:
    an input buffer that is configured to receive the row data in response to a clock signal and to sequentially shift previously received row data to store a plurality of row data items;
    a first operator that is configured to receive one row data item from the input buffer to perform half pel interpolation in parallel on a plurality of pixel values in the row data in a first direction;
    a second operator that is configured to receive one row data item from the input buffer while the first operator performs half pel interpolation, to perform half pel interpolation in parallel on a plurality of pixels in the row data in a second direction;
    a third operator that is configured to receive the half pel interpolation result of the second operator to perform the half pel interpolation in the first direction; and
    an output buffer that is configured to store the row data output from the input buffer and the half pel interpolation results performed by the first to third operators.

3. The image interpolation apparatus as set forth in claim 2, wherein the first to third operators arrange the plurality of pixel values in the row data to be offset by one to perform half pel interpolation on a plurality of pixels that exist in the same row in parallel.

4. The image interpolation apparatus as set forth in claim 2, wherein the input buffer comprises (M+5) line registers that are configured to store row data of size (N+5) received from the data storage unit by pixels; and
    wherein a plurality of data items that belong to different rows are stored in each of the line registers.

5. The image interpolation apparatus as set forth in claim 4, wherein the second operator performs half pel interpolation on data stored in the respective (M+5) line registers in the input buffer in parallel.

6. The image interpolation apparatus as set forth in claim 2, wherein the first to third operators perform half pel interpolation operations of Clip[{C1 −5*C2+20*C3+20*C4−5*C5+ C6}+16]/32], respectively, wherein, the input data is C1, C2, C3, C4, C5, and C6.

7. The image interpolation apparatus as set forth in claim 6, wherein the first to third operators are 6-tap finite impulse response (FIR) filters each having weights of 1, −5, 2-, 20, −5, and 1.

8. The image interpolation apparatus as set forth in claim 2, wherein the output buffer comprises:
    a first line register that is configured to store the row data input from the input buffer;
    a second line register that is configured to store the half pel interpolation result obtained by the first operator;
    a third line register that is configured to store the half pel interpolation result obtained by the second operator;
    a fourth line register that is configured to store the half pel interpolation result obtained by the third operator;
    a fifth line register that is configured to store row data input from the input buffer in a previous clock cycle; and
    a sixth line register that is configured to store the half pel interpolation result of the first operator obtained in the previous clock cycle.

9. The image interpolation apparatus as set forth in claim 8, wherein the data selection unit outputs data stored in two line registers among the first to sixth line registers in response to the data selection signals.

10. The image interpolation apparatus as set forth in claim 9, wherein the quarter pel interpolation unit performs the quarter pel interpolation operation of Clip{(D11+D22+1)/2} when input data items are D11 and D22.

11. An image interpolation apparatus comprising:
    a data storage unit that is configured to store input data to be interpolated;
    a half pel interpolation unit that is configured to perform half pel interpolation on the input data to provide half pel interpolation results;
    a data selection unit that is configured to select a portion of the half pel interpolation results to provide a selected portion of the half pel interpolation results; and
    a quarter pel interpolation unit that is configured to perform quarter pel interpolation on the selected portion of the half pel interpolation results in response to a motion vector, wherein the data storage unit stores data of a size of (M+5)×(N+5) when the input data has a size of M×N.

12. The image interpolation apparatus as set forth in claim 11 wherein the half pel interpolation unit is configured to perform half pel interpolation on the input data independent of the motion vector.

13. The image interpolation apparatus as set forth in claim 11 wherein the quarter pel interpolation unit is further configured to generate a data selection signal in response to the motion vector and wherein the data selection unit is configured to select the portion of the half pel interpolation results in response to the data selection signal.

14. The image interpolation apparatus as set forth in claim 12 wherein the quarter pel interpolation unit is further configured to generate a data selection signal in response to the motion vector and wherein the data selection unit is configured to select a portion of the half pel interpolation results in response to the data selection signal.

15. The image interpolation apparatus as set forth in claim 14:
wherein the half pel interpolation unit is configured to perform half pel interpolation on the input data to provide six lines of half pel interpolation results;
wherein the data selection unit is configured to select two of the six lines of the half pel interpolation results; and
wherein the quarter pel interpolation unit is configured to perform quarter pel interpolation on the selected two of the six lines of the half pel interpolation results.

16. An image interpolation method comprising:
storing input data to be interpolated;
performing half pel interpolation on the input data to provide half pel interpolation results;
selecting a portion of the half pel interpolation results to provide a selected portion of the half pel interpolation results; and
performing quarter pel interpolation on the selected portion of the half pel interpolation results in response to a motion vector,
wherein the storing input data to be interpolated comprises storing data of a size of (M+5)×(N+5) when the input data has a size of M×N.

17. The image interpolation method as set forth in claim 16 wherein performing half pel interpolation comprises performing half pel interpolation on input data independent of the motion vector.

18. The image interpolation method as set forth in claim 17 further comprising generating a data selection signal in response to the motion vector and wherein selecting a portion of the half pel interpolation results is performed in response to the data selection signal.

19. The image interpolation apparatus method as set forth in claim 18:
wherein performing half pel interpolation comprises performing half pel interpolation on the input data to provide six lines of half pel interpolation results;
wherein selecting a portion of the half pel interpolation results comprises selecting two of the six lines of the half pel interpolation results; and
wherein performing quarter pel interpolation comprises performing quarter pel interpolation on the selected two of the six lines of the half pel interpolation results.

* * * * *